(12) United States Patent
Jessen

(10) Patent No.: US 6,336,600 B1
(45) Date of Patent: Jan. 8, 2002

(54) SELF-PROPELLED MATERIAL SPREADER

(76) Inventor: Thomas F. Jessen, 855 Harrison Blvd., Valparaiso, Porter County, IN (US) 46383

( * ) Notice: Subject to any disclaimer, the term of this patent is extended or adjusted under 35 U.S.C. 154(b) by 0 days.

(21) Appl. No.: 09/710,315

(22) Filed: Nov. 10, 2000

Related U.S. Application Data

(60) Provisional application No. 60/164,466, filed on Nov. 10, 1999.

(51) Int. Cl.[7] ............................................... A01C 15/00
(52) U.S. Cl. ......................... 239/663; 239/67; 239/155; 239/170; 239/650; 239/662; 239/562; 239/681; 239/328
(58) Field of Search ................................ 239/146, 155, 239/170, 127, 328, 548, 562, 578, 650, 662, 663, 665, 681, 684, 685, 687, 67

(56) References Cited

U.S. PATENT DOCUMENTS

| | | | | |
|---|---|---|---|---|
| 3,877,645 A | * | 4/1975 | Oligschlaeger | 239/155 |
| 4,052,003 A | * | 10/1977 | Steffen | 239/170 X |
| 4,352,463 A | | 10/1982 | Baker | 239/663 |
| 4,483,483 A | | 11/1984 | Magda | 239/663 |
| 4,511,090 A | | 4/1985 | Morgan | 239/666 |
| 4,798,325 A | * | 1/1989 | Block | 239/663 |
| 4,901,655 A | | 2/1990 | Magda | 111/8 |
| 4,926,768 A | | 5/1990 | Magda | 111/11 |
| 4,955,538 A | * | 9/1990 | Laube et al. | 239/663 X |
| 5,333,795 A | * | 8/1994 | Jessen | 239/663 |
| 5,485,962 A | | 1/1996 | Moss | 239/655 |
| 5,501,403 A | | 3/1996 | Van Vooren | 239/662 |
| 5,533,676 A | | 7/1996 | Conley | 239/663 |
| 5,860,603 A | | 1/1999 | Raghu et al. | 239/589.1 |
| 5,860,604 A | | 1/1999 | Kooiker | 239/684 |

* cited by examiner

Primary Examiner—Steven J. Ganey
(74) Attorney, Agent, or Firm—Gary M. Hartman; Domenica N. S Hartman

(57) ABSTRACT

A self-propelled lawn and garden spreader that can be used to apply granular and/or liquid materials to both wide and narrow areas at a constant rate of application per unit area at different ground speeds, such as at a relatively high speed when the operator of the spreader is riding on the spreader, and at a relatively low speed when the operator is walking behind the spreader. The spreader generally includes a frame on which a suitable motor is mounted, wheels mounted to the frame with at least one of the wheels being driven by the motor, and a unit for controlling the ground speed of the spreader, including at least two forward speeds. The spreader further includes a material storage compartment mounted to the frame for containing a material. The material storage compartment has an outlet through which the material exits the material storage compartment and is delivered to a dispenser unit that broadcasts the material outwardly, including away from the sides of the frame. Finally, the spreader includes a device for controlling material flow from the material storage compartment to the dispenser unit. The material flow control device provides at least two flow rates of the material to the dispenser unit, in which the flow rates are synchronized with the at least two forward speeds of the spreader so that the spreader dispenses the material to achieve an approximately constant application rate per unit area at the at least two forward speeds.

24 Claims, 4 Drawing Sheets

SELF-PROPELLED MATERIAL SPREADER

CROSS REFERENCE TO RELATED APPLICATIONS

This application claims the benefit of U.S. Provisional Application No. 60/164,466, filed Nov. 10, 1999.

BACKGROUND OF THE INVENTION

1. Field of the Invention

The present invention generally relates to apparatuses for applying granular and/or liquid materials to lawns and gardens. More particularly, this invention relates to a self-propelled spreader configured to broadcast both granular and liquid materials at multiple rates that are synchronized with multiple forward speeds of the spreader so that the materials are dispensed to achieve an approximately constant application rate per unit area regardless of which of the forward speeds the spreader is operating.

2. Description of the Prior Art

Lawn and garden maintenance often includes the application of dry (e.g., granular) and liquid materials, including seed, fertilizers, insecticides, herbicides and flingicides. While dry and liquid materials have been broadcast on lawns and gardens using separate equipment, U.S. Pat. No. 5,333,795 to Jessen (incorporated herein by reference) discloses a single spreader unit capable of simultaneously dispensing both liquid or granular materials. Jessen's spreader unit includes a rotating platter for broadcasting granular materials and multiple spray nozzles for dispensing liquid materials. Though self-propelled to reduce the amount of effort required to apply materials to a lawn or garden, the spreader unit does not provide a platform by which the operator can ride on the unit. Even if so modified, there are circumstances in which the operator of the unit may prefer or be required to walk behind the spreader unit. To complete the application of material more quickly, it is generally typical that the maximum forward speed of a self-propelled spreader unit will be higher than the walking pace found comfortable by its operator, such that different forward speeds are required for the unit to operate under different conditions. Complicating this situation is the importance for the materials, and particularly fertilizers and herbicides that can harm grass and other desired vegetation if applied too heavily, to be applied at an approximately constant application rate per unit area, regardless of the forward speed of the spreader. Another complicating factor is the occasion when the material is to be applied to a relatively restricted or narrow area, necessitating that the extent to which the material is broadcast must be limited by the use of deflectors or by shutting off flow to the appropriate dispensers (e.g., nozzles). However, limiting the broadcast of the material should be done without increasing the application of material on the area being treated to avoid damage to vegetation within the treated area.

From the above, it can be seen that further improvements in lawn and garden spreaders would be desirable, and particularly a self-propelled spreader capable of uniformly applying a granular and/or liquid material on a lawn or other ground surface regardless of the speed of the spreader and regardless of the area of the ground surface being treated.

BRIEF SUMMARY OF THE INVENTION

The present invention provides a self-propelled lawn and garden spreader that can be used to apply granular and/or liquid materials to both wide and narrow areas at a constant rate of application per unit area at different ground speeds, such as at a relatively high speed when the operator of the spreader is riding on the spreader, and at a relatively low speed when the operator is walking behind the spreader. The spreader generally includes a frame on which a suitable motor is mounted, wheels mounted to the frame with at least one of the wheels being driven by the motor, and means for controlling the ground speed of the spreader, including at least two forward speeds. The spreader further includes a material storage compartment mounted to the frame for containing a material. The material storage compartment has an outlet through which the material exits the material storage compartment and is delivered to a dispenser unit that broadcasts the material outwardly, including away from the sides of the frame. Finally, the spreader includes a device for controlling material flow from the material storage compartment to the dispenser unit. According to the invention, the material flow control device provides at least two flow rates of the material to the dispenser unit, in which the flow rates are synchronized with the at least two forward speeds of the spreader so that the spreader dispenses the material to achieve an approximately constant application rate per unit area at the at least two forward speeds.

In view of the above, it can be appreciated that the spreader of this invention can be used to perform at least two types of treatments, either separately or simultaneously. In a preferred embodiment, the material storage compartment includes at least one tank of liquid treatment material. Hoses define fluid paths that connect the tank to multiple frame-mounted nozzles, and valves enable the operator to selectively cause fluid to flow to one or more of the nozzles. A pressure control device is also provided to maintain a constant pressure within the tank and hoses, regardless of which nozzle or nozzles are selected by the operator. The excess flow generated by the material flow control device is bypassed back into the tank, providing mixing of the contents. The nozzles are preferably grouped into at least two sets, each with a right and left nozzle that when operated together preferably cover the entire broadcast width desired for the liquid treatment material. The nozzles of each set also preferably have different flow rate capacities that, through proper selection of the nozzles, produce a constant rate of application per unit area at different ground speeds.

Also in a preferred embodiment, the spreader includes at least one bin as a material storage compartment for a granular treatment material, and a dispenser for dispersing the granular material on the ground surface being treated. Also preferably included is a deflector that can be used to prevent the granular material from being dispersed to either side of the spreader at the discretion of the operator, and a device for controlling the flow of the granular material to provide multiple sets of at least two flow rates. The granular flow control device is calibrated so that the flow rates of each set enable the spreader to dispense the granular material at an approximately constant application rate per unit area at the different forward speeds of the spreader.

Other preferred features of the invention include configuring the spreader to have drive wheels on a front section that includes the frame, with a sulky equipped with wheels mounted to the frame as a rear section of the spreader. The sulky provides a platform on which the operator can ride. The front and rear sections of the spreader can be connected together by an articulating joint linkage that enables the sections to bend side to side laterally for steering, and to rotate radially. To provide a method for treating small, difficult to reach or remote areas of a lawn or garden, the spreader is also equipped with a flexible squeeze bottle that can be filled from the storage compartment on the spreader, and then hand-operated remote from the spreader. The bottle is preferably equipped with a nozzle body that prevents fluid from splashing directly out of the nozzle body when the bottle is held upright and shaken.

Other objects and advantages of this invention will be better appreciated from the following detailed description.

DETAILED DESCRIPTION OF THE INVENTION

Figure 1:
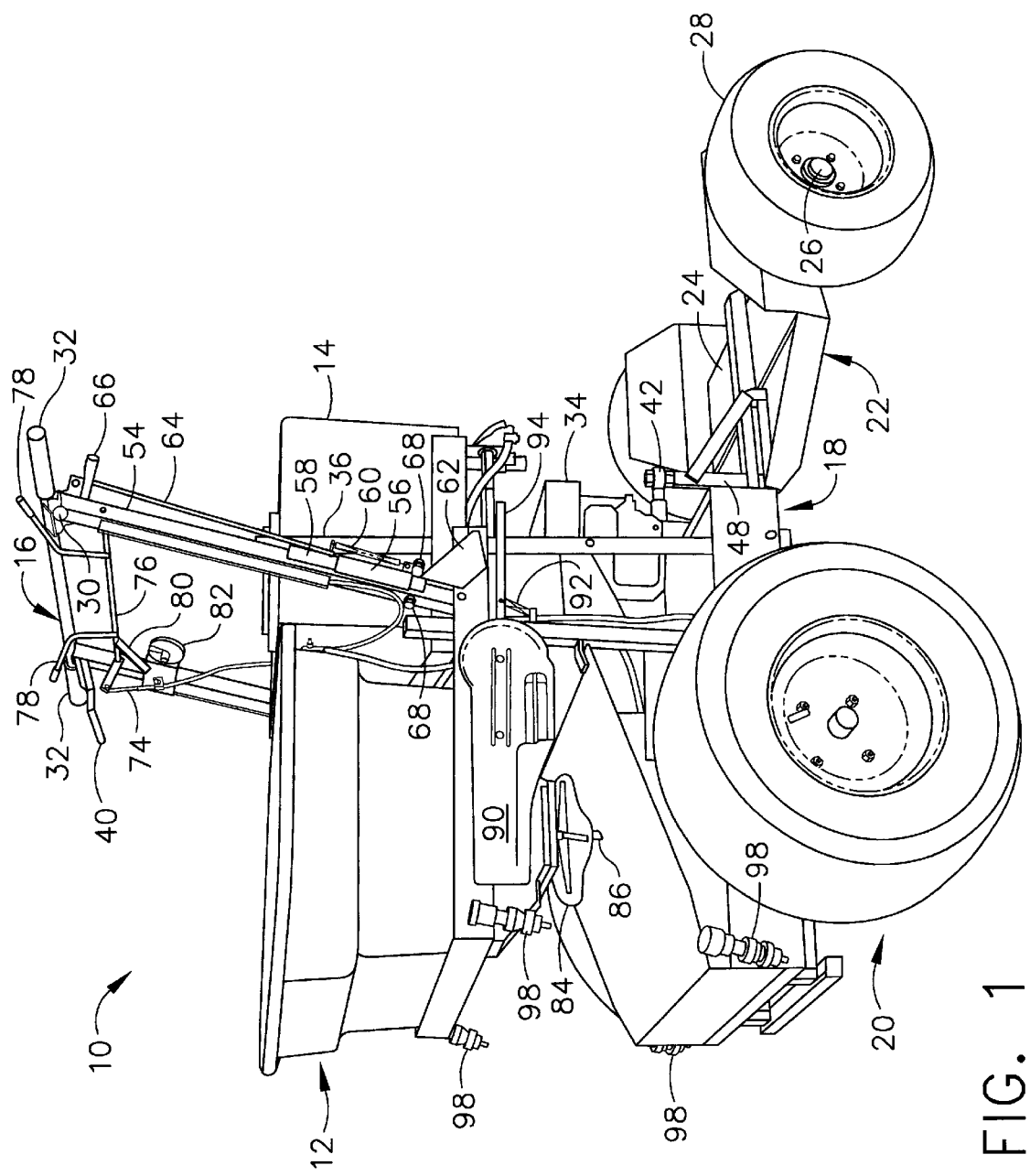
FIG. 1 shows a self-propelled spreader in accordance with a preferred embodiment of this invention.

FIG. 1 represents a self-propelled spreader 10 in accordance with a preferred embodiment of this invention. The spreader 10 is shown as including a granular storage bin 12, a tank 14 and a handle assembly 16 mounted to a chassis frame 18. The frame 18 may be formed of tube metal, though other forms for the frame 18 are foreseeable. A transaxle (not shown) is preferably mounted to the frame 18 for driving a pair of drive wheels 20 located near a forward end of the frame 18. A sulky 22 is mounted to a rearward end of the frame 18, and includes a platform 24 with a non-skid surface upon which the operator of the spreader 10 may stand. The sulky 22 is supported by a fixed axle 26 to which a pair of wheels 28 are mounted. The axle 26 and wheels 28 can be of any suitable type, and preferably include a braking mechanism (not shown), such as a band brake that can be hydraulically operated by a hand-activated hydraulic master cylinder 30 located on a handle bar 32 of the handle assembly 16. The master cylinder 30 is preferably equipped with a locking mechanism (not shown) by which the brake can be held to serve as a parking brake.

The transaxle preferably provides multiple forward gears, a reverse gear, neutral and a differential, and is operated in combination with a suitable clutch mechanism, preferably a centrifugal clutch of a type well known in the art. The transaxle is preferably driven by a motor 34, such as a four-cycle gasoline engine, through an appropriate drive system, preferably a belt and pulley system (not shown). A generator (not shown) is also preferably driven by the motor 34 to provide electrical power to the spreader 10, as will be discussed below. The motor 34 is mounted to the frame 18, along with an appropriate fuel reservoir, starter, throttle and other accessories conventional in the art. A shift lever 36 is shown as being located within easy reach of the operator. A stop bracket (not shown) can be used to locate the normal working gears of the transaxle. The shift lever 36 pivots about its lower end and is operably connected to the transaxle with a suitable shift linkage (not shown ). The motor throttle has preset run positions and controls the engine speed of the motor 34. Referring to FIG. 1, the throttle is remotely operated by means of a cable (not shown) which is operably connected to a lever 40 on the handle bar 32. The lever 40 has several detents or stops that establish an idle speed, a running speed and a choke setting. The throttle is returned to the idle position by a spring (not shown).

Figure 2:
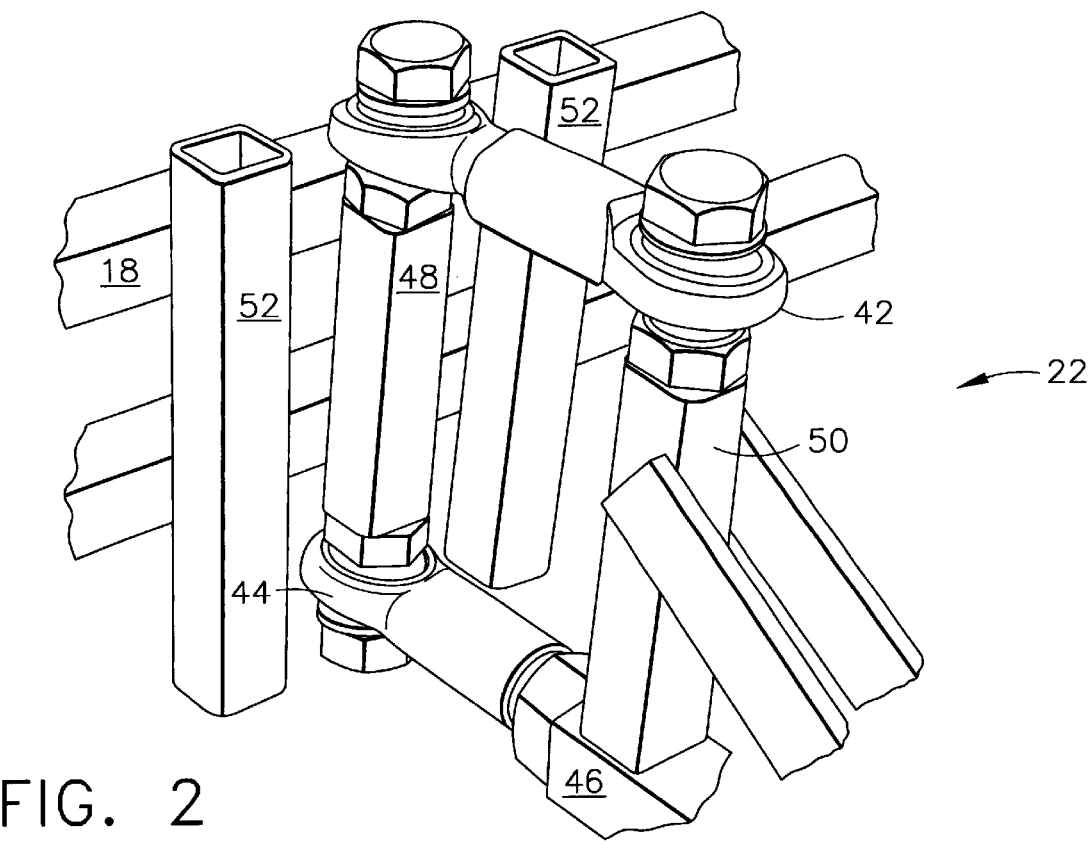
FIG. 2 shows an articulating joint mechanism by which a rear sulky is mounted to a front frame of the spreader in accordance with the preferred embodiment of the invention.

Referring to FIG. 2, the front frame 18 is connected to the rear sulky 22 by an articulating joint mechanism comprising an upper connecting link 42 with spherical rod ends at each end affixed by bolts or pins to the frame 18 and to the sulky 22. A lower pivot spherical rod end 44 protrudes from a tongue 46 of the sulky 22, and is secured to the frame 18 with a bolt or pin. A pair of separating columns 48 and 50 space the rod ends of the link 42 from the rod end 44 and tongue 46, respectively, of the sulky 22, to maintain a parallel relationship between the connecting link 42 and the tongue 46. The front spherical rod end of the upper connecting link 42 and the lower pivot spherical rod end 44 are axially aligned on the column 48 so as to permit the frame 18 and the sulky 22 to rotate about the axis of the column 48. The rear spherical rod end of the link 42 permits the sulky 22 to rotate about the axis of the tongue 46, through the lower pivot rod end 44 located at the bottom of the column 48. Two stops 52 made of, as an example, tubular metal are welded or otherwise secured at either side of the column 48 to limit the degree of rotation of the sulky 22 about the column 48.

Figure 3:
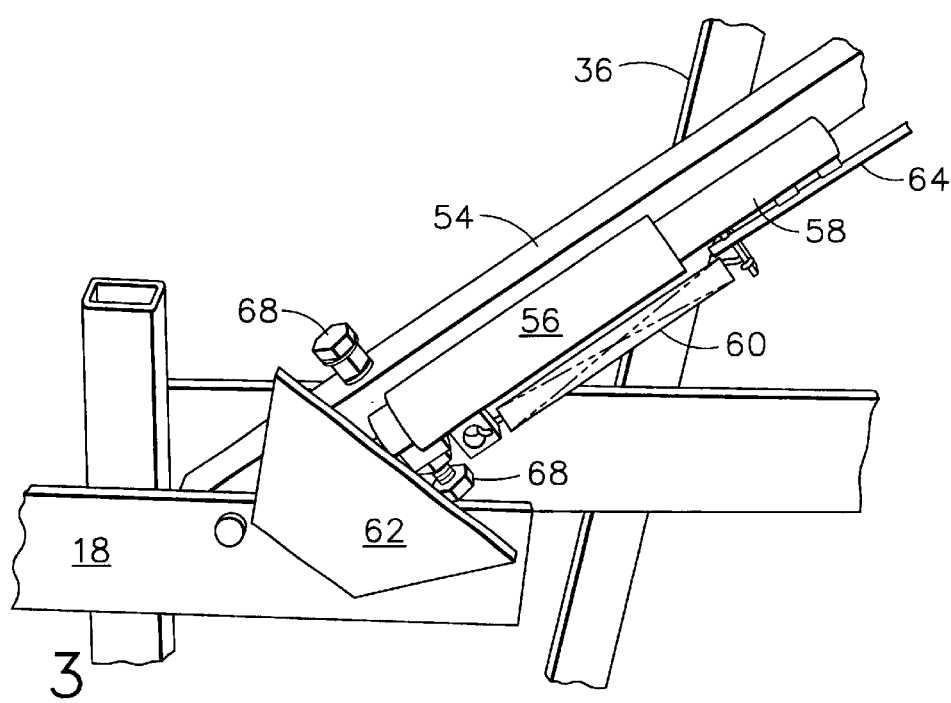
FIG. 3 represents a handle latching assembly in accordance with the preferred embodiment of this invention.

The handle assembly 16 is mounted to the frame 18 with bolts, clevis pins or the like, to provide a pivot for the assembly 18 at its lower end. The handle assembly 16 is configured to have at least two operating positions, with a mechanism to adjust the operating positions and a mechanism to quickly reposition and secure the handle bar 32, so as to allow the operator to maintain complete control of the spreader 10 as he or she steps onto the sulky 22 for riding the spreader, and off of the sulky 22 for walking behind the spreader 10. Referring to FIG. 3, the handle assembly 16 includes one or more extensions 54, with a guide 56 affixed to one or more of the extensions 54 by welding, bolting, or other means. The guides 56 are formed, as an example, of round tube through which a round latch 58 passes. Each latch 58 projects from both ends of its guide 56. An extension spring 60 is connected to each guide 56 and an upper portion of each latch 58 with brackets, screws, or bolts to automatically return the latch 58 to its original position when pulled and then released. When the handle assembly 16 is in a forward position, the latch 58 contacts a forward edge of a latch striker 62 secured to the frame 18, so that the handle assembly 16 is secured in a position most appropriate for riding the spreader 10. A top edge of the striker 62 is inclined downward toward the rear of the spreader 10, forming a track upon which the lower end of the latch 58 rides as it travels downwardly and rearwardly when the handle assembly 16 is pivoted rearward, thereby lowering the handle assembly 16 to a position most favorable for walking behind the spreader 10. As seen from FIG. 1, the upper end of the latch 58 is connected with a connecting rod 64 to a handle release lever 66 located near the handle bar 32. A lower end of the connecting rod 64 forms a stop to control the downward motion of the latch 58 by contacting the top of the guide 56 and, in the preferred embodiment, also provides the attachment point for the spring 60. Adjustment screws 68 are provided at the forward and rearward ends of one or both of extensions 54 to limit the travel of the handle assembly 16 by striking the frame 18. Other forms of latch mechanisms are foreseeable.

The bin 12 is intended to store a granular material, such as a fertilizer, herbicide or other granular treatment material, while the tank 14 is intended to contain a liquid treatment material, such as a liquid fertilizer, herbicide or fungicide. Accordingly, both the bin 12 and the tank 14 are formed of materials compatible with the material they are intended to contain. The bin 12 has an opening at its top and a bottom portion with a sloped or trough shape to ensure that granular material contained in the bin 12 will readily flow by gravity to the bottom of the bin 12. The bin 12 may also be fitted with a hinged or removable lid (not shown) to close the opening. The bin 12 includes at least one outlet 38 (FIG. 5) through which the granular material within the bin 12 will flow by gravity for dispensing, as will be discussed below.

Figure 5:
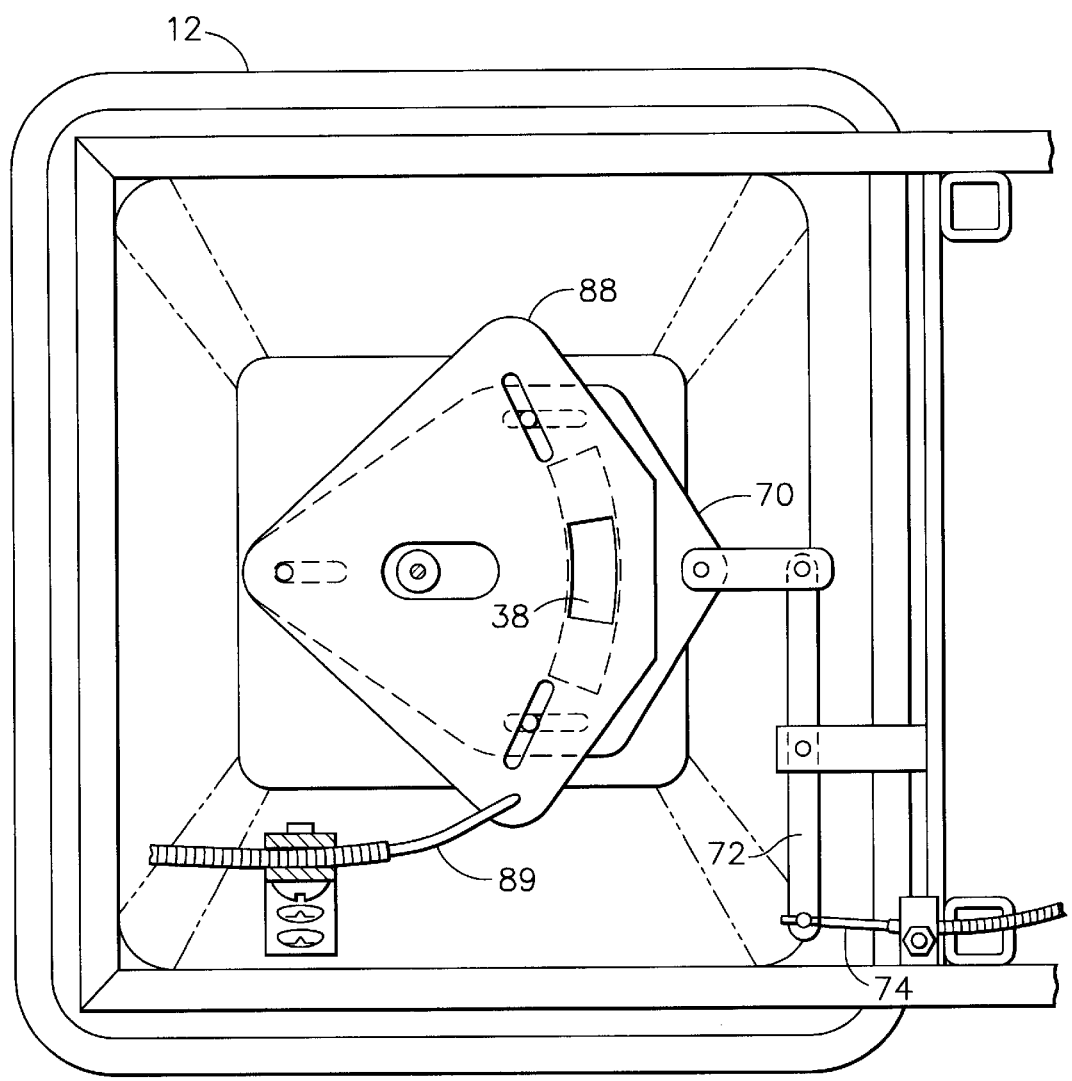
FIG. 5 is a bottom view of a bin for containing a granular material dispensed by the spreader of FIG. 1.

With further reference to the bin 12, FIG. 5 is a bottom view of the bin 12 and shows a sliding gate 70 for opening and closing the bin outlet 38. One end of a lever 72 is connected to the sliding gate 70, while a wire 74 is connected to the opposite end of the lever 72. The wire 74 is actuated with a bell crank control rod 76 that extends across the handle bar 32, as shown in FIG. 1. At either end of the control rod 76, a rod extension 78 is in close proximity to the handle bar 32 to permit opening and closing of the gate 70 with the operator's thumb or forefinger of either hand. An arm 80 projects from the control rod 76 so as to encounter an adjustable stop 82 that limits the amount of rotation of the control rod 76, and therefore the movement of the sliding gate 70. The adjustable stop 82 consists of a round dial with a helical ramp around the circumference, such that the relative distance between the arm 80 and helical ramp changes as the dial is rotated to control the opening of the sliding gate 70. In the preferred embodiment, the stop 82 is calibrated to provide multiple sets of positions for the gate 70 to achieve different flow rates of granular material from the bin 12. The flow rates for each set are calibrated for each of the different forward speeds provided for the spreader 10, so that the spreader 10 dispenses the granular material at an approximately constant application rate per unit area at the different forward speeds. For example, if the spreader 10 has two established forward speeds, to apply a specified amount of granular material per unit area, the stop 82 has two settings for the desired application rate, one for each forward speed. Various other configurations for controlling and calibrating the opening provided by the gate 70 are foreseeable.

As shown in FIG. 1, a spinner platter 84 is positioned below the outlet 38 of the bin 12. The rotatable platter 84 is driven by a shaft 86, which in turn is driven by the motor 34 through an appropriate drive system, such as the belt and pulley system discussed above. A wire (not shown) may be attached to the upper end of the shaft 86 and extend into the bin 12 to agitate the granular material and prevent plugging of the outlet 38 of the bin 12. The spinner platter 84 spins to radially distribute the granular material. In accordance with known practice, a pivoting diffuser plate 88 actuated by wire 89 (FIG. 5) is preferably located between the bin 12 and the gate 70 to balance the spreader pattern between the right and left lateral directions by directing the granular material to specific areas of the platter 84. A hinged flap or deflector 90 is shown in FIG. 1 as being held in position above and out of the granular path by a spring 92, but capable of being pivoted into the granular path with a handle 94 to intercept and deflect the granular material to reduce the width of the spreader pattern for edging property.

Figure 4:
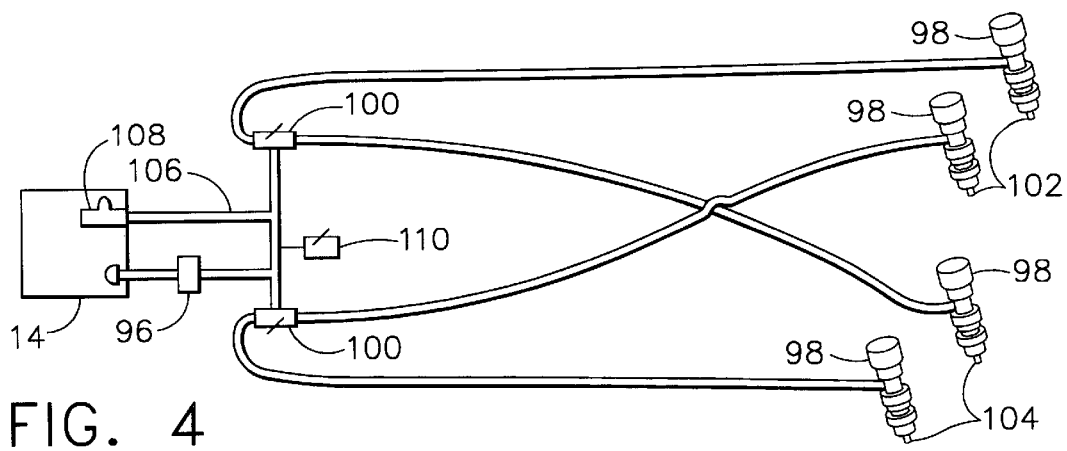
FIG. 4 represents a liquid storage and dispensing system in accordance with this invention.

Referring now to FIG. 4, the tank 14 is connected with a hose or other suitable passage to diaphragm pump 96. Additional hoses are shown as connecting the pump 96 to four separate spray nozzles 98, each of which is configured to dispense the liquid contained within the tank 14 as a spray directed toward the front and sides of the spreader 10. Valves 100 located in the fluid paths defined by the hoses enable the operator to select which nozzle 98 or nozzles 98 are supplied with liquid from the pump 96. The nozzles 98 are shown as being divided into two separate broadcast pairs, with one pair 102 being located above the second pair 104 on the frame 18. The nozzles 98 of the first pair 102 have a higher output capacity and are used when operating the spreader 10 at a higher of two forward speeds, such as when the operator is riding on the sulky 22, while the nozzles 98 of the second pair 104 have a lower output capacity and are used when operating the spreader 10 at a lower of two forward speeds, such as when the operator is walking behind the sulky 22. The flow capacities of the nozzles 98 of the different pairs 102 and 104 are chosen so that, for a given amount of pressure generated by the pump 96, the same application rate per unit area is achieved when only the high-capacity pair 102 are used at the faster of two forward speeds as when only the low-capacity pair 104 are used at the slower of the two forward speeds. Either nozzle 98 of either nozzle pair 102 or 104 can be turned off by the valves 100 to reduce the width of broadcast spray and align the spray pattern with the granular spread pattern determined with the deflector 90. A return hose 106 allows the unused output of the pump 96 to be bypassed back to the tank 14, which advantageously provides mixing of the liquid within the tank 14. The hose 106 terminates with a pressure relief valve 108 that maintains a predetermined pressure within the flow path between the pump 96 and the nozzles 98. The pump 96 is preferably operated by a switch (not shown) mounted on the handle bar 32 to allow the spray from the nozzles 98 to be turned on and off. Power for the pump 96 can be provided by a generator (not shown) driven by the motor 34, as discussed above.

Figure 6:
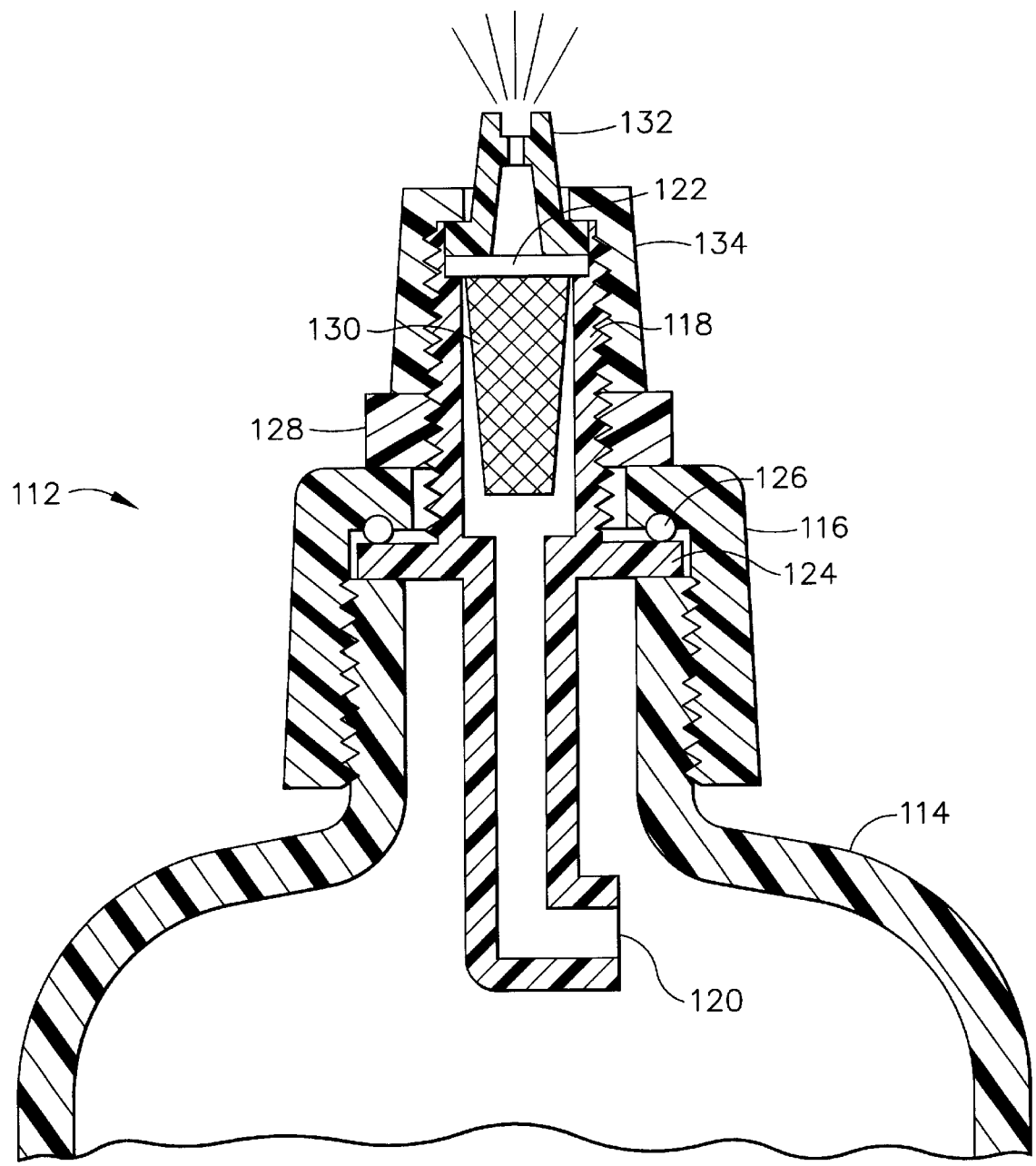
FIG. 6 shows a handheld spot sprayer in accordance with the preferred embodiment of the invention.

As shown in FIG. 4, an additional valve 110 is provided that enables the tank 14 to be drained, as well as enables filling of a small handheld spot sprayer 112, shown in FIG. 6. The sprayer 112 consisting of a flexible plastic bottle 114 with a removable cap 116 penetrated by a nozzle body 118. The nozzle body 118 has an inlet 120 on its interior end so as to be in communication with the fluid contents of the bottle 114 when assembled with the bottle 114, and an outlet 122 on its exterior end. The nozzle body 118 further has a flange 124 and threads on its exterior end. An o-ring 126 forms a compression seal between the flange 124 and the cap 116 when an external nut 128 is tightened on the nozzle body 118. A strainer 130 and nozzle 132 are provided at the nozzle body outlet 122, and are secured to the nozzle body 118 with a nozzle cap 134. The nozzle 132 preferably creates a fan-shaped pattern with the liquid dispensed from the bottle 114, the width of the pattern increasing with the pressure exerted on the bottle 114. Light pressure creates a narrow spray for spot treating, such as applying herbicide to individual weeds, while higher pressures disperse the spray in a wider spray pattern for treating larger turf areas. Different nozzles 132 can be used to shape the spray pattern, adjust the angle of spray and change the flow rate. The strainer 130 protects the nozzle 132 from becoming clogged by particles present in the fluid, which might otherwise distort the spray pattern, cause fine droplets to be discharged that can drift in the wind, or misdirect the spray off target. In lieu of or in addition to the strainer 130, the inlet 120 can be formed to comprise a number of openings facing the sidewall of the bottle 114, with the openings being sufficiently small to prevent particles from entering the nozzle body 118.

According to the invention, the inlet 120 to the nozzle body 118 is offset from the outlet 122 to define a fluid flow path that significantly reduces the amount of fluid that is ejected from the nozzle 132 when the sprayer 112 is held upright and shaken. As shown in FIG. 6, the inlet 120 is at a right angle to the outlet 122 of the body 118, which causes the inlet 120 to be disposed facing a sidewall of the bottle 114. The resulting bend in the flow path acts as a baffle to prevent unintentional flow through the path, even if the sprayer 112 is shaken while in an upright position or remains inverted for an extended period of time. The sprayer 112 is preferably mounted to the spreader 10 with any suitable bracket (not shown). In use, the operator removes the sprayer 112 from its bracket, inverts the bottle 114, and then squeezes to dispense the liquid. When the sides of the bottle 114 are released, the liquid remaining in the flow path is forced back into the bottle 114 by the incoming air. Thereafter, the liquid will not flow through the nozzle body 118 as long as the pressure within the bottle 114 is substantially equal to the pressure outside of the bottle 114, i.e., the bottle 114 is not squeezed. Similar results can be achieved with sprayers configured differently from that shown in FIG. 6. For example, the functions of the nozzle body 118, strainer 130, nozzle 132 and/or nozzle cap 134 could be combined into a single component, which defines a circuitous (i.e., nonlinear) flow path that acts as a baffle to prevent unintentional flow from the sprayer. Furthermore, a sufficiently circuitous flow path can be defined simply by providing a flow path with two passages having adjacent portions that are parallel but offset from each other, thereby defining two ninety-degree turns in the flow path. Accordingly, such modifications are within the scope of this invention.

While the invention has been described in terms of a preferred embodiment, it is apparent that other forms could be adopted by one skilled in the art. Accordingly, the scope of the invention is to be limited only by the following claims.

What is claimed is:

1. A self-propelled spreader comprising:
   a frame having a front portion, a rear portion, and oppositely-disposed side portions;
   a motor mounted to the frame;
   wheels mounted to the frame, at least one of the wheels being driven by the motor;
   a platform secured to the rear portion of the frame for supporting an operator in a standing position, the platform enabling the operator to selectively step onto the platform to ride the self-propelled spreader and to step off of the platform to walk behind the self-propelled spreader;
   means for controlling and varying the ground speed of the self-propelled spreader, the speed controlling and varying means defining at least two forward speeds for the self-propelled spreader, at least a first of the forward speeds enabling the operator to walk behind the self-propelled spreader and at least a second of the forward speeds being faster than the first forward speed;
   a material storage compartment mounted to the frame for containing a material, the material storage compartment having an outlet through which the material exits the material storage compartment;
   means for dispensing the material away from the side portions of the frame;
   means for delivering the material from the material storage compartment to the dispensing means; and
   means for controlling material flow from the material storage compartment to the dispensing means, the material flow control means providing at least two flow rates of the material to the delivering means, the material flow control means synchronizing the at least two flow rates with the at least two forward speeds of the self-propelled spreader so that the self-propelled spreader dispenses the material to achieve an approximately constant application rate per unit area at the at least two forward speeds.

2. A self-propelled spreader according to claim 1, wherein the dispensing means comprises at least first and second sets of dispensing units, the first set of dispensing units having a higher flow rate capacity than the second set of the dispensing units.

3. A self-propelled spreader according to claim 2, wherein the material flow control means is adapted to dispense the material through only the first set of dispensing units when the self-propelled spreader travels at a higher of the at least two forward speeds and dispenses the material through only the second set of dispensing units when the self-propelled spreader travels at a lower of the at least two forward speeds.

4. A self-propelled spreader according to claim 1, wherein the material storage compartment is a liquid storage compartment, and the material is a liquid material.

5. A self-propelled spreader according to claim 4, wherein the dispensing means comprises at least first and second sets of nozzles, the first set of nozzles having a higher flow rate capacity than the second set of the nozzles.

6. A self-propelled spreader according to claim 5, wherein the material flow control means is adapted to deliver the liquid material only to the first set of nozzles when the self-propelled spreader travels at a higher of the at least two forward speeds, and delivers the liquid material only to the second set of nozzles when the self-propelled spreader travels at a lower of the at least two forward speeds.

7. A self-propelled spreader according to claim 4, wherein the dispensing means comprises at least first and second sets of dispensing units and the material flow control means is adapted to selectively dispense the liquid material through either or both of the first and second sets of dispensing units, the selfpropelled spreader further comprising means for maintaining a substantially constant pressure within the liquid storage compartment and the delivering means regardless of from which of the first and second sets of dispensing units the liquid material is being dispensed.

8. A self-propelled spreader according to claim 7, wherein the maintaining means comprises means for bypassing excess flow from the material flow control means to the liquid storage compartment and a pressure relief valve through which the liquid material reenters the liquid storage component from the bypassing means.

9. A self-propelled spreader according to claim 4, further comprising:
   a granular material storage compartment mounted to the frame for containing a granular material, the granular material storage compartment having an outlet through which the granular material exits the granular material storage compartment;
   means for receiving the granular material from the granular material storage compartment and then broadcasting the granular material from the self-propelled spreader; and
   second means for controlling flow of the granular material from the granular material storage compartment to the broadcasting means.

10. A self-propelled spreader according to claim 9, wherein the receiving and broadcasting means comprises a rotatable disc beneath the outlet of the granular material storage compartment.

11. A self-propelled spreader according to claim 9, wherein the second flow control means provides at least two flow rates of the granular material to the receiving and broadcasting means, the second flow control means calibrating the at least two flow rates of the granular material with the at least two forward speeds of the self-propelled spreader so that the self-propelled spreader dispenses the granular material to achieve an approximately constant application rate per unit area at the at least two forward speeds.

12. A self-propelled spreader according to claim 1, further comprising a sulky pivotally attached to the frame, the platform being mounted to the sulky, the sulky comprising at least one wheel to support the sulky and the platform.

13. A self-propelled spreader according to claim 1, further comprising a handle pivotally mounted to the frame, the handle being angularly adjustable between at least two positions.

14. A self-propelled spreader according to claim 1, further comprising a handheld spray device removably mounted to the self-propelled spreader, and means fluidically connected to the delivering means for filling the handheld spray device.

15. A self-propelled spreader according to claim 14, wherein the handheld spray device comprises:
   a flexible bottle with a cavity for holding the material and an opening for introducing the material into the cavity from the filling means;
   nozzle means mounted to the bottle and comprising an inlet disposed within the cavity, an outlet disposed outside of the bottle, and a circuitous passage therebetween that inhibits the material from flowing into the inlet from the cavity, through the passage and then out of the bottle through the outlet when the pressure within the cavity is substantially equal to the pressure outside of the bottle.

16. A self-propelled spreader comprising:
   a frame having a front portion, a rear portion, and oppositely disposed side portions;
   a sulky pivotally attached to the frame at the rear portion thereof, the sulky comprising a platform for supporting an operator of the self-propelled spreader;
   a motor mounted to the frame;
   a first set of wheels mounted to the frame adjacent the front portion thereof, the first set of wheels being driven by the motor;
   a second set of wheels mounted to the sulky to support the platform;
   a handle pivotally mounted to the frame, the handle being angularly adjustable between at least two positions;
   means for controlling the speed of the self-propelled spreader, the speed controlling means defining at least two forward speeds for the self-propelled spreader;
   a granular material storage compartment mounted to the frame for containing a granular material, the granular material storage compartment having an outlet through which the granular material exits the granular material storage compartment;
   means for receiving the granular material from the granular material storage compartment and then broadcasting the granular material from the self-propelled spreader;
   means for controlling flow of the granular material from the granular material storage compartment to the broadcasting means;
   a liquid material storage compartment counted to the frame for containing a liquid treatment material, the liquid material storage compartment having an outlet through which the liquid treatment material exits the liquid material storage compartment;
   means for dispensing the liquid treatment material away from the side portions of the frame;
   means for delivering the liquid treatment material for the liquid material storage compartment to the dispensing means;
   means for controlling flow of the liquid treatment material from the liquid material storage compartment to the dispensing means, the liquid material flow control means providing at least two flow rates of the liquid treatment material to the delivering means, the liquid material flow control means synchronizing the at least two flow rates with the at least two forward speeds of the self-propelled spreader so that the self-propelled spreader dispenses the liquid treatment material to achieve an approximately constant application rate per unit area at the at least two forward speeds.

17. A self-propelled spreader according to claim 16, wherein the dispensing means comprises at least first and second sets of nozzles, each of the first and second sets of nozzles comprising at least one nozzle located at each of the side portions of the frame, the nozzles of the first set of nozzles being located above the nozzles of the second set of nozzles, the nozzles of the first set of nozzles having a higher flow rate capacity than the nozzles of the second set of the nozzles.

18. A self-propelled spreader according to claim 17, wherein the liquid material flow control means is adapted to deliver the liquid treatment material only to the first set of nozzles when the self-propelled spreader travels at a higher of the at least two forward speeds and delivers the liquid treatment material only to the second set of nozzles when the self-propelled spreader travels at a lower of the at least two forward speeds.

19. A self-propelled spreader according to claim 18, further comprising means for maintaining a substantially constant pressure within the liquid material storage compartment and the delivering means regardless of from which of the first and second sets of nozzles the liquid treatment material is being dispensed.

20. A self-propelled spreader according to claim 19, wherein the maintaining means comprises means for bypassing excess flow from the material flow control means to the liquid material storage compartment and a pressure relief valve through which the liquid treatment material reenters the liquid material storage component from the bypassing means.

21. A self-propelled spreader according to claim 16, wherein the granular material flow control means provides multiple sets of at least two flow rates of the granular material to the receiving and broadcasting means, the granular material flow control means calibrating the at least two flow rates of each of the multiple sets with the at least two forward speeds of the self-propelled spreader so that the selfpropelled spreader is operable to dispense the granular material to achieve an approximately constant application rate per unit area at the at least two forward speeds.

22. A self-propelled spreader according to claim 16, further comprising a handheld spray device removably mounted to the self-propelled spreader, and means fluidically connected to the delivering means for filling the handheld spray device.

23. A self-propelled spreader according to claim 22, wherein the handheld spray device comprises:
   a flexible bottle with a cavity for holding the treatment material and an opening for introducing the treatment material into the cavity from the filling means;
   nozzle means mounted to the bottle and comprising an inlet disposed within the cavity, an outlet disposed outside of the bottle, and a circuitous passage therebetween that inhibits the treatment material from flowing into the inlet from the cavity, through the passage and then out of the bottle through the outlet when the pressure within the cavity is substantially equal to the pressure outside of the bottle.

24. A self-propelled spreader according to claim 23, wherein the circuitous passage of the nozzle means comprises an approximately ninety-degree bend that causes the inlet to be disposed facing a sidewall of the bottle.

* * * * *